United States Patent [19]

Hall

[11] Patent Number: 4,503,885

[45] Date of Patent: Mar. 12, 1985

[54] ENGINE FUEL SUPPLY SYSTEM

[75] Inventor: John F. Hall, Bloomfield Hills, Mich.

[73] Assignee: Chrysler Corporation, Highland Park, Mich.

[21] Appl. No.: 562,267

[22] Filed: Dec. 16, 1983

[51] Int. Cl.³ .............................................. F17B 1/00
[52] U.S. Cl. ................... 137/574; 137/576; 137/599.1; 137/569; 123/514; 123/516
[58] Field of Search .............. 137/571, 574, 576, 599, 137/599.1, 569; 123/514, 516

[56] References Cited

U.S. PATENT DOCUMENTS

| | | | |
|---|---|---|---|
| 2,215,469 | 9/1940 | Janssen | 123/516 |
| 2,550,808 | 5/1951 | Hays et al. | 137/576 |
| 2,767,736 | 10/1956 | Lackinger | 137/574 |
| 3,020,950 | 2/1962 | Schraivogel | 137/574 |
| 3,049,171 | 8/1962 | Neverburg | 137/574 |
| 3,726,310 | 4/1973 | Coscia | 137/576 |
| 4,279,232 | 7/1981 | Schuster | 123/516 |
| 4,397,333 | 8/1983 | Liba et al. | 137/574 |

FOREIGN PATENT DOCUMENTS 1145303 10/1957 France .............................. 137/569

*Primary Examiner*—Alan Cohan
*Assistant Examiner*—John A. Rivell
*Attorney, Agent, or Firm*—Kenneth H. MacLean, Jr.

[57] ABSTRACT

In association with a vehicle engine, a fuel system including a fuel tank with an inlet pickup for discharging fuel from the tank, pump means to transport fuel from the tank pickup to the engine in a quantity normally in excess of the quantity needed for engine operation at normal operating speeds, and means to return excess fuel back to the tank into a relatively small volume reservoir device surrounding the fuel pickup which enhances the fuel level about the fuel pickup under conditions of low fuel level in the remainder of the tank. The excess fuel returned to the tank passes through a flow control device including a jet aspirator which is the means to enhance the reservoir fuel level and including alternate flow control means to maintain continuous flow into the reservoir whenever the jet aspirator is blocked.

4 Claims, 4 Drawing Figures

U.S. Patent  Mar. 12, 1985  4,503,885
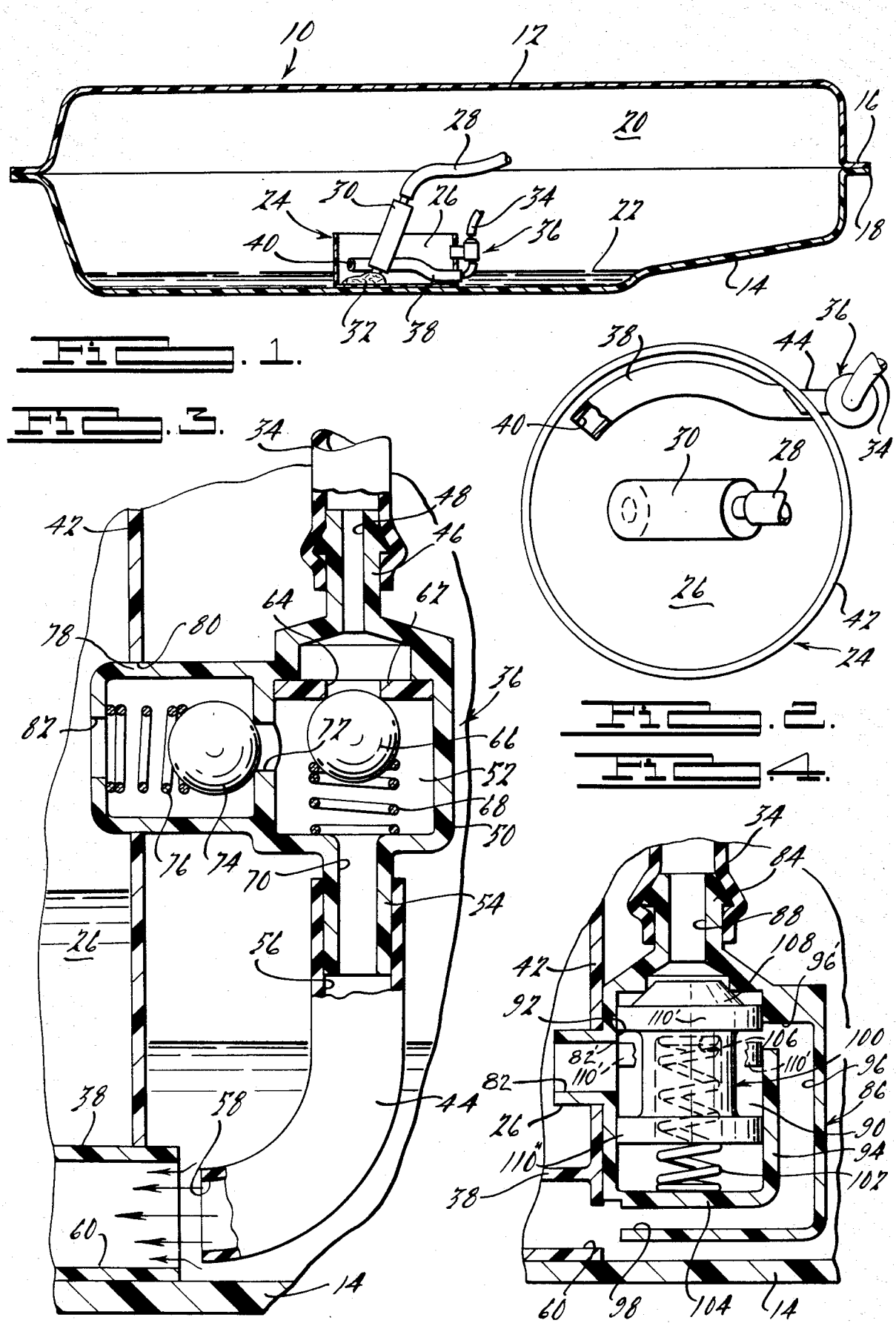

ENGINE FUEL SUPPLY SYSTEM

BACKGROUND OF THE DISCLOSURE

This application concerns an invention relating to vehicle fuel systems and particularly such a system which includes means to enhance or increase the fuel level with respect to a pump inlet particularly when the level in the fuel tank is relatively low, and also includes an alternate flow control to route fuel into the reservoir when blockage occurs in the primary level enhancing mechanisms.

Vehicles and particularly those with an internal combustion engine with a fuel injection system use a fuel pump to transport fuel from the fuel tank to the engine in quantities in excess of the engine needs under normal operating conditions. The excess fuel is returned to the fuel tank. It is desirable to provide a means in the fuel tank which will enhance or increase the fuel level surrounding a fuel pickup or fuel inlet. This fuel pickup may take the form of the inlet end of an in-tank electric fuel pump. In any case, when the level of fuel in the fuel tank drops to a relatively low level, say only one inch depth, it is desirable to provide means around the fuel pickup or inlet which will increase the level of fuel thereabout and with respect to the level in the remainder of the tank. Certain maneuvers of a vehicle will cause the fuel inlet to be uncovered and thus starve the fuel inlet or pickup. The resultant decrease of the already low fuel level may even cause engine malfunctions or stalling and particularly such problems with vehicles having a fuel injected engine.

Prior art disclosing a collector or reservoir assembly is disclosed in U.S. Pat. No. 4,397,333 to Liba and Rafferty which patent is assigned to Chrysler Corporation. In this patent, a small collector or reservoir is situated on the bottom of a fuel tank and encircles a fuel pickup or inlet of a fuel pump. An inlet tube near the bottom of the collector or reservoir assembly permits the flow of fuel therein from a fuel return line as well as from the surrounding fuel tank. The fuel from the return line is discharged at relatively high velocity into the open tube inlet of the reservoir. This jet action of fuel drags or induces fuel from the remainder of the tank into the reservoir or collector interior thus building up the fuel level therein with respect to the fuel level in the remainder of the tank. This type of fuel level enhancement may be characterized as jet aspiration owing to the effect of directing a high velocity flow of fuel into an open tube inlet to induce flow of additional quantities of fluid.

The fuel reservoir assembly described in the aforementioned patent has proven to operate successfully to produce significantly increased fuel levels with respect to the fuel inlet. However, if the conduit or return passage means for the excess fuel from the engine becomes blocked, the aforedescribed jet aspirator action ceases. Without the jet aspirator action, the fuel level within the cannister or reservoir will drop substantially. One cause of a blockage of return fuel could be the formation of ice around the outlet portion of the return line. Formation of ice is a result of water in the fuel. Water can be introduced to the fuel tank at a gas station in which the underground fuel tank has a leak or is not properly maintained so as to prevent accumulation of large quantities of water.

The subject improved fuel system includes a level enhancing reservoir or cannister in the fuel tank and also provides valved control means to insure a continuous return of fuel to the interior of the cannister or reservoir even if the jet aspirator outlet becomes clogged or otherwise blocked. Also, if the blockage is caused by the formation of ice at the outlet of the fuel return line, the resultant flow of excess fuel from the relatively warm engine compartment tends to unblock the outlet. Thus ice blockage of the jet outlet may be automatically melted.

Therefore, an advantage of the subject improved fuel and level enhancing system is its automatic functioning to ensure a continuous flow of return fuel to the reservoir to supply fuel for the inlet of the pump.

A further advantage of the system is the provision of valved flow control means normally supplying a primary flow of excess fuel through a jet aspirator to cause the fuel level in the cannister or reservoir to be increased with respect to fuel in the main part of the tank but including alternate flow means to ensure the continuous flow of the excess fuel even when the jet aspirator outlet may become blocked.

Other advantageous features of the subject application wil be obvious after a reading of the following detailed description of a preferred embodiment shown in the drawings described as follows.

IN THE DRAWINGS

In FIG. 1, a sectioned elevational view of a vehicle fuel tank is shown including the subject fuel return system.

FIG. 2 is a planer view of the fuel return system.

FIG. 3 is an enlarged sectioned view of the automatic return flow control.

FIG. 4 is an enlarged sectioned view of a second embodiment of the automatic return flow control.

DETAILED DESCRIPTION OF THE EMBODIMENTS

In FIG. 1, a vehicle fuel tank 10 is illustrated. The fuel tank 10 includes thin walled upper housing half 12 and lower housing half 14. Each member 12 and 14 has an outwardly extending flange portions 16 and 18 about their edge periphery. The members 12 and 14 are both generally cup-shaped and when brought together at flanges 16 and 18 they enclose an interior space 20 for storing fuel 22 and defining a space above the fuel which is not taken up by the fuel.

The subject engine fuel system includes an upwardly open cup-shaped fuel cannister or reservoir assembly 24 similar to the device in the above identified patent. The reservoir assembly 24 defines an interior space 26 within fuel tank 10 of relatively limited volume with respect to the volume of the interior 20 of fuel tank 10. Extending to the interior 26 of reservoir 24 is a fuel supply line 28 for the engine. The fuel supply line 28 is attached to an outlet portion of electric fuel pump 30 which extends into space 26 formed by the reservoir assembly 24. An inlet of the fuel pump 30 extends toward the bottom of the reservoir 24 and supports a strainer assembly 32 which is of nylon mesh material and acts as a fuel filter. Under normal operation of the vehicle, the fuel pump 30 pumps substantially more fuel from the reservoir 24 than is required for engine operation. This over capacity fuel pumping system is universally used with engine fuel injection systems which are in common use at the present time.

The excess fuel which is unnecessary for operating the engine is returned to the fuel tank through a return conduit 34. Return 34 is connected to a flow control device 36. The control device 36 is best illustrated in FIG. 3 where it is shown attached to wall 42 of the reservoir assembly 12. Fuel normally enters the reservoir interior 26 through an inlet in the form of tube 38 which projects through wall 42. Referring back to FIG. 1, tube 38 extends from wall 42 into the interior 26 of the assembly 24 and terminates at an outlet end 40 which is elevated with respect to the inlet. Fuel is free to flow into inlet tube 38 of the assembly 12, and fuel can be induced to pass into the interior 26 by the jet flow action of fuel from the return. The return fuel flows and is directed into the inlet 38 by means of an extension tube 44 whose open end is aligned but not spaced from the inlet 38.

The control device 36 has a thin walled enclosure means with an inlet fitting 46 defining inlet 48 to which return conduit 34 attaches as shown in FIG. 3. The main body 50 of the control device further defines a flow chamber 52 for the passage of fuel from the inlet 48. Fluidly connected with the interior 52 is an outlet portion 54 defining an outlet opening 70. The tube 44 attaches to the outlet fitting 54 and defines a passage 56 therefrom which terminates at the outlet end 58 of the tube 44. Outlet end 58 is aligned with the open end of tube 38 so as to direct a relatively high velocity flow axially into the inlet passage 60 of assembly 24. This high velocity flow causes fuel from the surrounding portion of the tank to be drawn into inlet passage 60 and hence into the reservoir interior 26.

Referencing back to the main body portion 50 of the control device, a valve seat forming member 62 defines a passage 64 therethrough located between inlet passage 48 and the outlet passage 70 and regulates flow of fuel from inlet 48 to outlet 70. Seated against the member 62 is a spherically shaped or ball valve member 66 which is held against the member 62 by a spring member 68. When the pressure of fluid upstream of ball valve 66 increases enough to compress spring 68, fluid flows into the chamber 52 and hence through the tube 44.

In the event that the outlet 58 of tube 44 is blocked, for instance by ice formation, the pressure within the chamber 52 of housing 50 increases significantly. Another opening or outlet passage 72 in the housing 50 is normally closed by a spherical shaped or ball valve 74 coacting with wall 50 of the housing. A spring 76 holds the ball valve 74 closed to normally block fluid flow through the passage 72. Spring 76 is slightly stiffer than spring 68, i.e., more fluid pressure is required to move ball valve 74 away from its valve seat than is required to move ball valve 66 away from its seat. As the pressure in chamber 52 increases by blockage of outlet 58, the valve 74 is moved away from the wall 50 and fuel flows through passage 72. Fuel then flows past the valve 74 and spring 76 and through housing extension 78. The fuel is discharged through an opening 82 in extension 78 and into the reservoir interior 26. This flow into the interior 26 ensures that there is sufficient fuel for the pump 30.

The fuel returning through return line 34 is relatively warm after its passage through the warm engine compartment. This warmed fuel flows from the reservoir interior 26 and through tube 38 thereby impinging on the outlet of the tube 44. The warmed fuel thus may melt any ice blockage at the outlet of tube 44.

It should be noted in FIG. 3 that the control device 36 is supported with respect to reservoir 24 and with respect to the inlet end of tube 38 by insertion of the housing extension 78 within an opening 80 in the side wall 42 of the assembly 24. The device 36 may be fixed in this position by a variety of means including an interference fit between member 78 and wall 42 as shown.

In FIG. 4, a second embodiment 86 of the flow control valve is illustrated. Like the first embodiment in FIG. 3, the device includes a thin walled enclosure including an inlet portion 84 defining an inlet 88 for accepting return fuel from conduit 34. An interior chamber 90 is partially defined by cylindrical walled surface 92 within housing 94. An outlet passage 96 extends from the interior 90 and terminates at an outlet 98 which is axially aligned with inlet passage 60 of the reservoir inlet means 38. Located for reciprocal movement within the cylinder 92 is a spool type valve 100. The valve 100 is biased upward to a closed position shown in FIG. 4 by a spring 102 which seats against a bottom wall 104 of the housing 94. The upper end portion of spring 102 is received in a hollow bore 106 of the spool valve 100 which permits the spool valve 100 to move downward in FIG. 4 from its closed position. When the valve 100 moves downward against spring 102, a conically shaped valve surface 108 moves from a valve seat formed by the housing permitting fuel to flow from the return line 34 through the inlet 88 and into the outlet passage 96 for discharge from the open outlet end 98. Note that the cylindrically shaped upper end portion 110' of valve 100 moves downward within the cylinder 92 to clear the edge portion 96' to permit fuel to pass into the outlet passage 96.

When either passage 96 or outlet end 98 thereof is blocked, the fuel pressure on valve 100 increases sufficiently and moves valve 100 further downward against spring 102 until the cylindrical portion 110' is moved past the upper surface 82' of a second outlet passage 82 which extends through the reservoir wall 42. In this position, the lower cylindrical portion 110' of the valve is close to the bottom wall 104 of the housing. Fuel may then flow from the inlet 88 and past the portion 110' directly into the outlet 82.

It should be noted that during normal operation of the control valve 86, the upper cylindrical portion 110' of valve 100 blocks any direct flow from the inlet 88 to the passage 82 by the interaction between the upper portion 110' and the wall means 94 as is evident from FIG. 4 and the alternate illustration of the depressed position of portion 110' as labeled 112 in FIG. 4. However, when the outlet 98 is blocked, the pressure on valve 100 will cause further movement of the valve 100 downward so that the flow can directly flow between portion 110' and the upper surface 82'.

Although only two embodiments of the invention have been illustrated and described in detail, the invention is as described in the following claims.

What is claimed is:

1. In a vehicle having an engine, a fuel supply system comprising:
   a fuel tank defining an interior storage space;
   fuel inlet means to withdraw fuel from the tank interior adjacent the tank bottom;
   reservoir forming means in the fuel tank having a vertical wall with first and second openings therethrough which surround the fuel inlet means to provide a significant level of fuel over the inlet means;
   a fuel pump to supply fuel to the engine from the reservoir means and connected to the inlet means, characterized by a greater pumping capacity than the engine requires under normal operation;

fuel return means to direct any excess fuel which is pumped to the engine back to the fuel tank;

a flow control device having an inlet fluidly connected to the fuel return and having two outlets connected respectively to the first and second opening in the reservoir wall means;

the first opening to the reservoir being open both to flow from one of the outlets of the flow control device and to flow from the fuel tank interior which surrounds the reservoir so that the high velocity flow from the flow control device into the first opening induces flow from the fuel tank into the reservoir whereby the fuel level in the reservoir is increased with respect to a low fuel level surrounding the reservoir;

the flow control device having check valve means to normally prevent flow through the second outlet but operable in response to increasing fuel pressures to permit flow through the second opening when the first becomes blocked.

2. An engine fuel supply system for a vehicle comprising:

a fuel tank with a bottom partially defining an interior storage space;

fuel inlet means to withdraw fuel from the tank interior adjacent the tank bottom;

reservoir forming means supported by the tank bottom and having a vertical wall with first and second openings therethrough which surround the fuel inlet means to provide a significant level of fuel over the inlet means;

a fuel pump to supply fuel to the engine from the feservoir and connected to the inlet means, characterized by a greater pumping capacity than the engine requires under normal operating condition thereby providing excess pumped fuel;

fuel return means to direct any excess fuel from the engine back to the fuel tank;

a flow control device having an inlet fluidly connected to the the fuel return and having two outlets connected respectively to the first and second openings in the reservoir wall means;

the first opening to the reservoir being open both to flow from one of the outlets of the flow control device and to flow from the interior of the fuel tank surrounding the reservoir so that the high velocity flow of fuel from the flow control device into the first opening induces flow from the fuel tank into the reservoir whereby the fuel level in the reservoir is increased with respect to a low fuel level in the interior of the fuel tank around the reservoir;

the flow control device having a check valve means controlling flow through the second outlet of the flow control device so as to prevent flow through the second outlet into the reservoir under normal conditions but to permit flow therethrough into the reservoir when the first outlet of the flow control device becomes blocked.

3. An engine fuel supply system comprising:

a fuel tank having a bottom partially defining an interior storage space;

fuel inlet means to withdraw fuel from the tank interior adjacent the tank bottom;

reservoir forming means defining a vertical wall about the inlet means and having first and second vertically spaced openings therethrough for providing a significant level of fuel over the inlet means;

a fuel pump for supplying fuel to the engine from the reservoir characterized by greater pumping capacity than necessary for engine operation under normal conditions;

fuel return means to direct excess of fuel from the engine back to the fuel tank;

a flow control device having an inlet fluidly connected to the fuel return means and having two outlets fluidly connected respectively to the first and second opening in the reservoir forming means;

the first opening of the reservir being open both to flow from one of the outlets of the flow control device and also open to the fuel tank interior surrounding the reservoir and adjacent the bottom thereof to direct a high velocity flow from the flow control device into the first opening thus inducing flow from the fuel tank into the reservoir whereby the fuel level in the reservoir is increased with respect to a low fuel level in the tank surrounding the reservoir;

the flow control device having first check valve means preventing flow from the fuel tank to the engine but opening in response to fuel pressure to permit flow from the engine into the fuel tank;

the flow control device having second check valve means to normally prevent flow through the second outlet but openable in response to increasing pressures caused by blcokage of the first outlet to permit flow therethrough.

4. In an engine fuel system of the type having a fuel tank with a fuel pump for withdrawing fuel through its inlet from the tank in quantities greater than necessary for normal engine operation and including fuel return means from the engine to the fuel tank, a flow control device and reservoir assembly, comprising:

a reservoir assembly in the fuel tank having a vertical wall means about the fuel pump inlet, lower and upper openings in the reservoir wall for introducing fuel therein from the pump and the remainder of the tank;

a flow control device including thin walled enclosure means having an inlet portion connected to the fuel return means, a primary outlet portion spaced from but aligned with the lower opening in the reservoir to direct a relatively high velocity stream of fuel into the lower opening whereby additional fuel is drawn therewith into the lower opening to build the fuel level in the reservoir to an increased level with respect to fuel in the remainder of the tank when at a relatively low level, and a secondary outlet portion associated with the upper opening of the reservoir;

fuel pressure responsive means of the flow control device for normally regulating fuel to flow from the inlet portion to the primary outlet portion and alternately to the secondary outlet portion when the primary outlet portion is blocked.

* * * * *